(12) United States Patent
Niessen et al.

(10) Patent No.: US 8,555,478 B2
(45) Date of Patent: Oct. 15, 2013

(54) METHOD FOR ASSEMBLY OF AUTOMOTIVE VEHICLE BODY COMPONENTS

(75) Inventors: Bert Niessen, Heimbach (DE); Ruediger Maier, Creutzwald (FR)

(73) Assignee: Ford Global Technologies, LLC, Dearborn, MI (US)

( * ) Notice: Subject to any disclaimer, the term of this patent is extended or adjusted under 35 U.S.C. 154(b) by 415 days.

(21) Appl. No.: 12/985,785

(22) Filed: Jan. 6, 2011

(65) Prior Publication Data
US 2011/0167608 A1 Jul. 14, 2011

(30) Foreign Application Priority Data
Jan. 11, 2010 (DE) .......................... 10 2010 000 777

(51) Int. Cl.
*B23Q 17/00* (2006.01)
(52) U.S. Cl.
USPC .................... 29/407.1; 29/407.09; 29/407.01; 29/407.05; 29/897.2; 702/1
(58) Field of Classification Search
USPC ................. 29/407.09, 407.01, 407.05, 407.1, 29/897.2, 428, 429
See application file for complete search history.

(56) References Cited

U.S. PATENT DOCUMENTS 6,691,392 B2 * 2/2004 Savoy et al. ............... 29/407.09
7,143,494 B2 12/2006 Savoy

FOREIGN PATENT DOCUMENTS

| DE | 4216606 A1 | 11/1993 |
| DE | 10135158 A1 | 2/2003 |
| DE | 102125708 A1 | 11/2003 |
| EP | 1036730 A2 | 9/2000 |
| WO | 2006123077 A1 | 11/2006 |
| WO | 2009071244 A1 | 6/2009 |

OTHER PUBLICATIONS

European Patent Office, Search Report for corresponding GB Patent Application No. 11150358.7 mailed Mar. 16, 2011.

* cited by examiner

*Primary Examiner* — Richard Chang
(74) *Attorney, Agent, or Firm* — Damian Porcari; Brooks Kushman P.C.

(57) ABSTRACT

A method for fitting a vehicle body component to a body shell of a vehicle having at least one side wall includes the steps of gauging an actual position of a partial area of the side wall relative to a first coordinate axis of the vehicle, plotting a first reference point relative to the first coordinate axis on the basis of the gauged actual position, and mounting the vehicle body component at a designated position relative to the first reference point. The partial area may advantageously be a vehicle A-pillar, B-pillar, or C-pillar. The method affords a simpler and more cost-effective fitting of the vehicle body components. The method is also feasible in less mechanized production facilities.

12 Claims, 4 Drawing Sheets

METHOD FOR ASSEMBLY OF AUTOMOTIVE VEHICLE BODY COMPONENTS

This application claims foreign priority benefits under 35 U.S.C. §119 (a)-(d) to DE 10 2010 000 777.3, filed Jan. 11, 2010, which is hereby incorporated by reference in its entirety.

BACKGROUND

1. Technical Field

The invention relates to a method for fitting a vehicle body component to a body shell of a vehicle having side walls. The invention further relates to a bracket especially for use in this method.

2. Background Art

In modern vehicles exacting standards are required for precise locating of the vehicle body components in the vehicle body, since this serves to define a gap and fit pattern, which describes the gap spacing of vehicle body parts. In the assembled state, components such as headlamps, fenders, radiator grille, trunk lid and engine hood should form minimal and preferably parallel gaps with the least possible variations. Fitting steps are also subject to similarly exacting requirements. In fitting, therefore, the vehicle body part must be inserted very precisely into the body shell. Subsequent corrections are very expensive to make.

There is currently a trend toward modularization in automobile construction. Modularization involves the use of pre-assembled modular units being fabricated for later assembly with one another. This modularization may lead to any errors in shape/dimension of the components being compounded by virtue of the vehicle body parts pre-assembled to form the unit, which makes the fitting of these units whilst adhering to the gap and fit pattern substantially more difficult. One such unit, for example, is the front end of the vehicle, which may comprise the radiator frame, cooling assembly, engine hood lock, headlamps, and bumpers.

DE 42 16 606 A1 describes tangible reference points for the vehicle body parts, which build up a unified dimensional reference system and are used as neutral starting positions. Templates or gauges are intended to provide further fitting aids for fitted parts using these reference points. A comparatively high equipment outlay is therefore necessary. U.S. Pat. No. 7,143,494 B2 proposes an elaborate method for setting reference points for the vehicle body components on the previously plotted body shell, which take account of dimensional variations in the manufacture and welding of the body shell and which are sensed by sensors for the fitting of vehicle body parts.

SUMMARY

The disclosed method for fitting a vehicle body component to a vehicle body affords a simpler and more cost-effective fitting of the vehicle body components. The method is also feasible in less mechanized production facilities.

In a disclosed embodiment, a method for fitting a vehicle body component to a body shell of a vehicle having at least one side wall comprises gauging an actual position of a partial area of the at least one side wall relative to a first coordinate axis of the vehicle, plotting a first reference point relative to the first coordinate axis on the basis of the gauged actual position, and mounting the vehicle body component at a designated position relative to the first reference point. The partial area may advantageously be a vehicle A-pillar, B-pillar, or C-pillar, depending upon the configuration of the vehicle.

In another disclosed embodiment, a method for fitting a front end support frame to a body shell of a vehicle having a left and a right side wall comprises gauging an actual position of a partial area of at least one of the side walls relative to a lateral axis of the vehicle; registering the actual position of the partial area relative to the lateral axis; from the actual position, determining an actual zero point of the body shell relative to the lateral coordinate axis; plotting a first reference point relative to the lateral axis on the basis of the actual zero point; plotting a second reference point relative to the lateral axis on the basis of the actual zero point, the second reference point being located an equal distance from the zero point in an opposite direction along the first coordinate axis; and securing the front end support frame to the body shell at a designated position relative to at least one of the first and second reference points.

BRIEF DESCRIPTION OF THE DRAWINGS

The present invention will be explained in more detail below with reference to examples represented in the drawings. The drawings show.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1A:
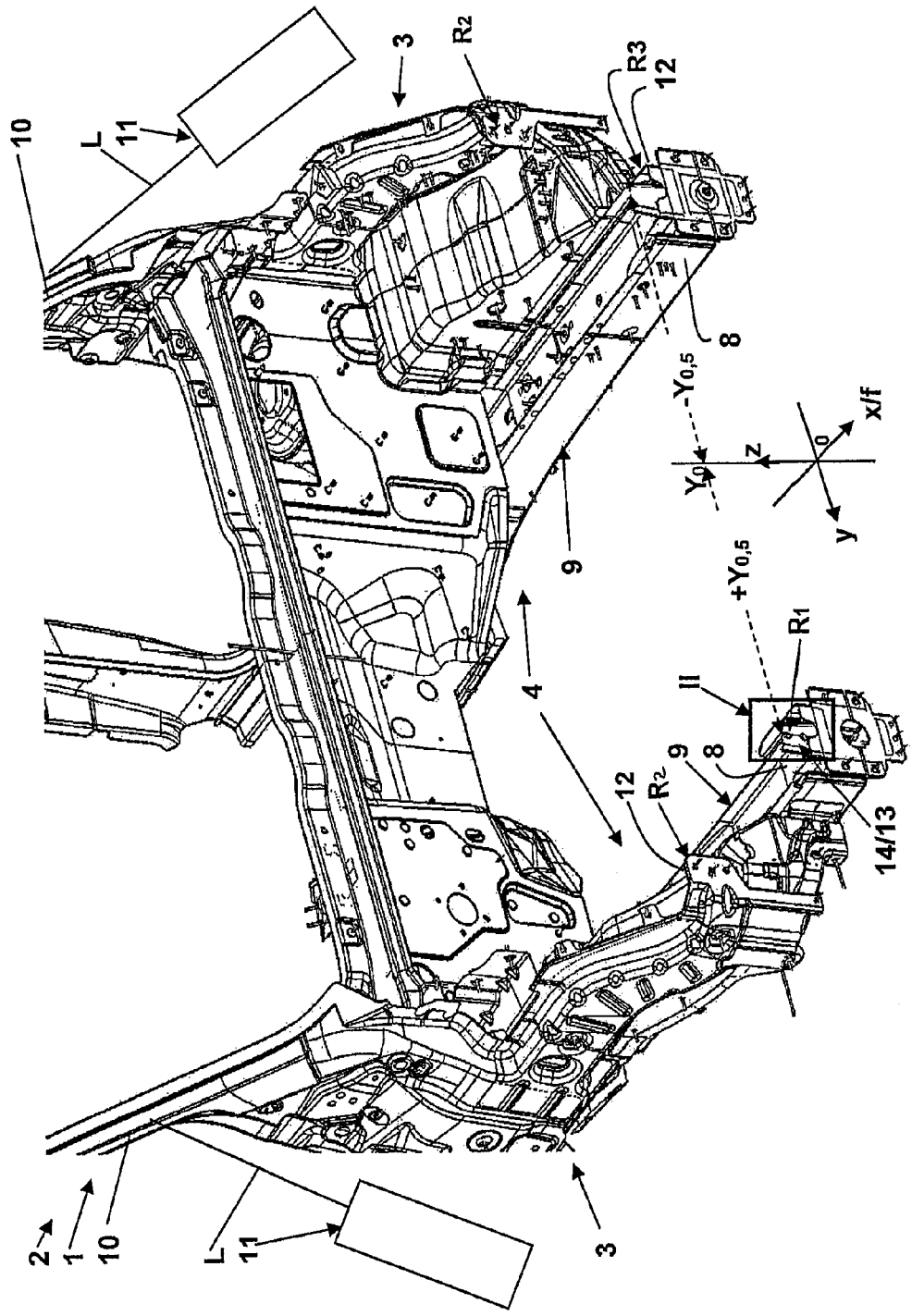
FIG. 1a is a perspective top view of a front part of a body shell of a vehicle.
Figure 1B:
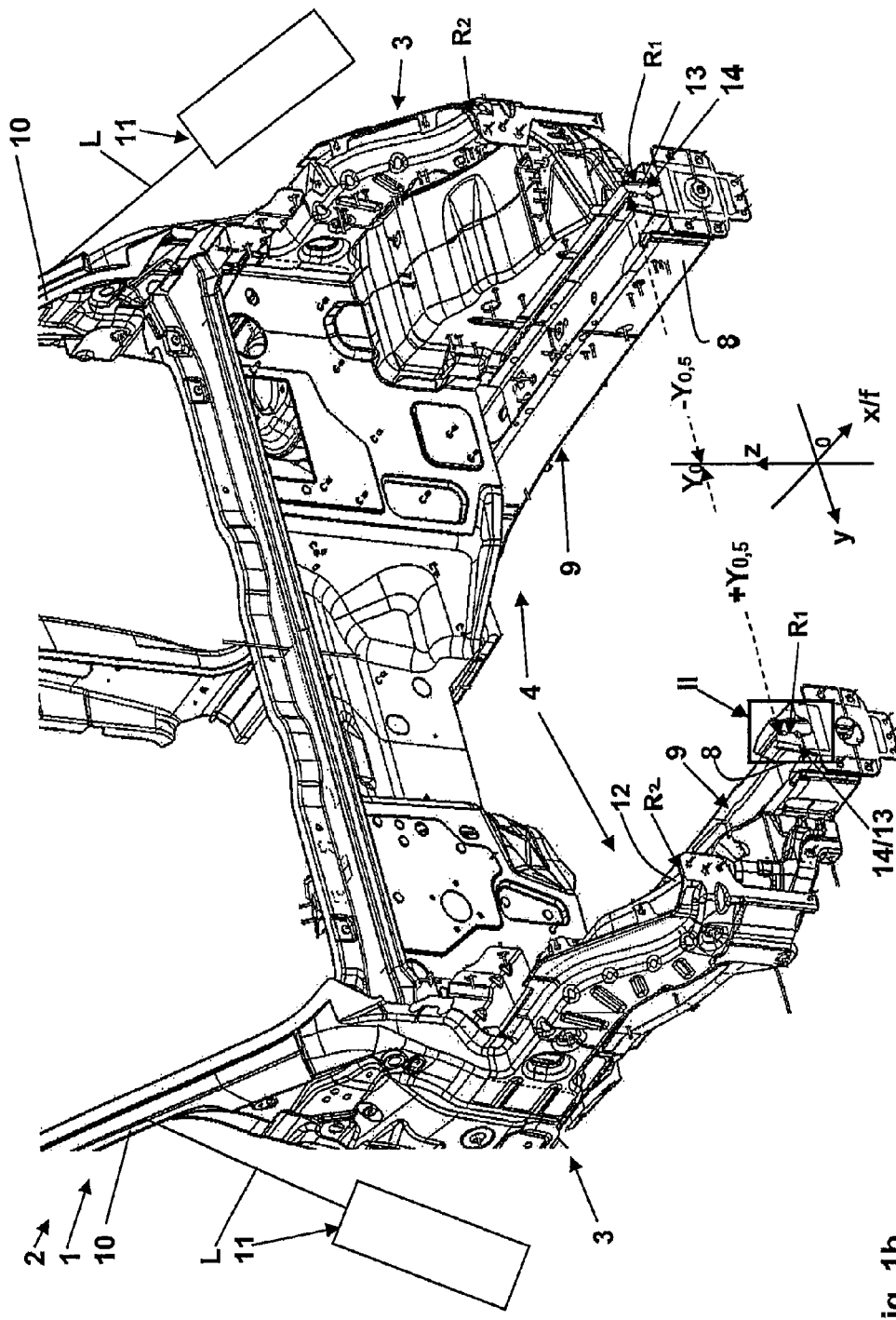
FIG. 1b is a perspective top view of a front part of the body shell of the vehicle, but with modified reference point.
Figure 2:
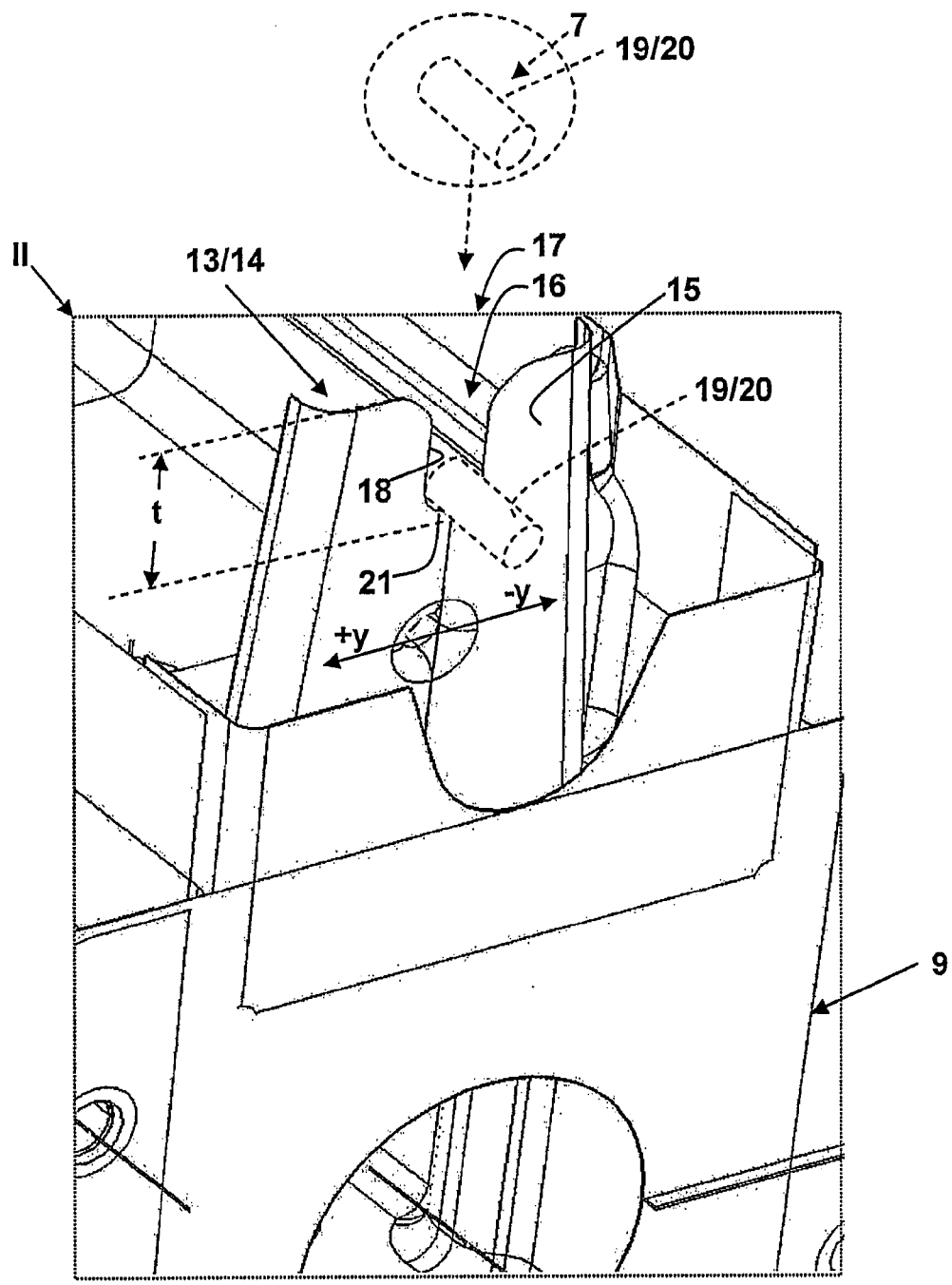
FIG. 2 is a detailed enlargement II according to FIGS. 1a and 1b.
Figure 3:
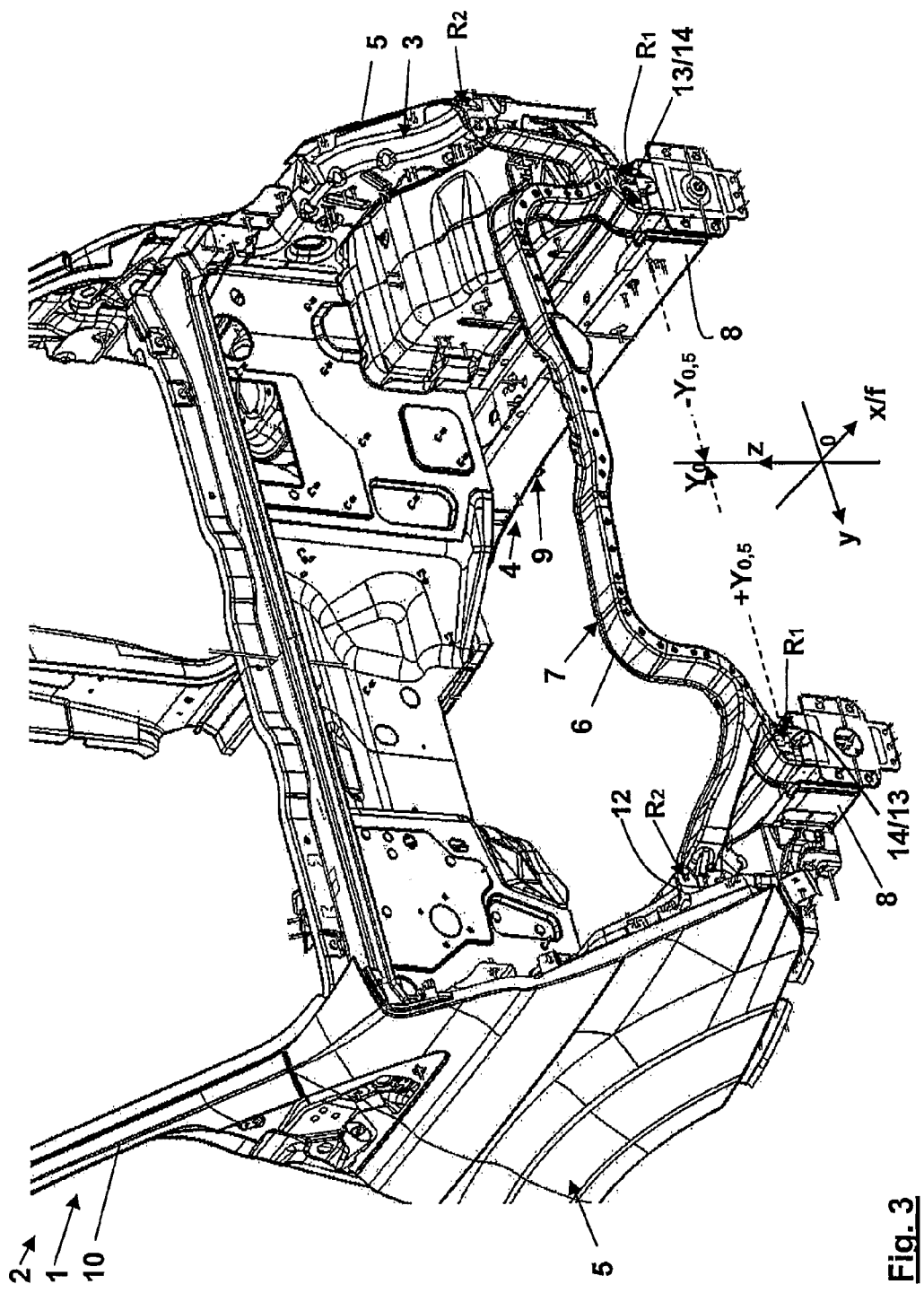
FIG. 3 is a perspective top view of the front part of the body shell according to FIG. 1b, but with front fenders and a front support frame fitted.

FIGS. 1a, 1b, and 3 each represent a perspective top view of a front part (viewed in the direction of travel f) of a body shell 1 of a vehicle 2 with side walls 3 and underbody assembly 4. The exemplary embodiment of FIG. 1a differs from the exemplary embodiment of FIG. 1b merely in the configuration of a reference point, as will be described below. FIG. 3 additionally shows fitted vehicle body components, in this case both front fenders 5 and a support frame 6 of a front end 7, not represented fully here. FIG. 2 represents a detail of FIG. 1a.

In the embodiment shown in FIG. 1a, four reference points $R_1$, $R_2$, and $R_3$ are identified relative to the vehicle body using the X coordinate axis (longitudinal), the Y coordinate axis (lateral) and the Z coordinate axis (vertical). The reference points $R_1$, $R_2$ and $R_3$ allow the support frame 6 (and hence the front end 7 attached thereto) to be precisely located for fitting. A reference point $R_2$ is located on each of the left and right side walls 3, and different reference points $R_1$ and $R_3$ are identified at the front on the left and right side members 9 of the underbody assembly 4.

In the FIG. 1b embodiment, a reference point $R_1$ is identified at the front on both the left and right side member 9.

The support frame 6 of the front end 7 thereby bridges the transition from the underbody assembly 4 or in this case from the side members 9 to the side walls 3. Dimensional tolerances in the production and assembly of side walls 3 and underbody assembly 4 may cumulatively lead to errors, particularly relative to the Y-axis. As a result the front end 7, here in FIG. 3 represented only by its support frame 6, may have a poor gap and fit pattern with the fenders 5 and/or the engine hood (not shown here) when fully fitted into the body shell 1.

The disclosed method remedies the above problems in as much as the starting point is the body shell 1 with underbody assembly 4 and side members 9. In a first step, the actual position of at least one partial area of at least one of the side walls 3 in the body shell 1 is gauged relative to at least a first coordinate axis of the vehicle 2. In the exemplary embodiments shown here, the partial area is the A-pillar 10 and the first axis is the Y-axis or vehicle lateral axis. Here the actual position of both A-pillar 10 relative to the Y-axis is determined using a contactless measuring device 11, which may operate by projecting a laser beam L. An actual vehicle center $y_0$ is then calculated relative to the Y-axis. The actual position of the side walls 3 relative to the actual vehicle center $y_0$ or their distance from the latter is identified in the drawing by $+Y_{0.5}$ and $-Y_{0.5}$.

In a second step, at least one reference point, in this case the reference point $R_1$, here relative to the Y-axis of the vehicle 2, is plotted for the front end 7 and its support frame 6 on the basis of the actual position determined for the side walls 3. This reference point $R_1$ serves for fixing the position of the front end 7 relative to the Y-axis.

In a third step the front end 7 and the support frame 6 of the front end 7 are fitted. Since the locating of the reference point $R_1$ on the side member 9 (or on both left and right side members 9, as in the embodiment of FIG. 1b) relates to the actual position of the side walls 3 and to the actual vehicle center $y_0$ determined from this, the aforementioned possible dimensional errors are compensated for. An optimum gap and fit pattern can thereby be achieved on fitting the front end 7 and the adjoining vehicle body parts, for example the fenders 5 and/or the engine hood (not shown).

Here in each case the reference point $R_2$ is fixed on the side walls 3 relative to the Z-axis, that is to say the vehicle vertical axis or height, and to the X-axis, the vehicle longitudinal axis or length. At the reference point $R_3$, as seen in FIG. 1a, an X-axis limit stop 12 is defined and fixed relative to the side member 9. Similarly, an X-axis limit stop 12 is defined at the reference point $R_1$ on the side member 9 relative to the X-axis. The locating of the support frame 6 (and hence of the rest of the front end 7 attached to the support frame) is thereby fixed relative to all three coordinate axes X, Y, Z, the determination of the Y-axis being based on the actual position of the side wall 3 or the side walls 3 relative to one another and to the underbody assembly 4.

The X coordinate of the front end may thus be fixed by means of the limit stop 12 counter to the direction of travel, that is to say in a negative X direction of the vehicle, against the underbody assembly, in particular against the side member and/or front cross member. The locating of at least one reference point relative to the X-axis of the front end can thereby be fixed by means of this X-axis limit stop 12 on at least one side member and/or front cross member.

As is apparent from the exemplary embodiment in FIG. 1a, the provision of only one reference point $R_1$ is sufficient to determine the position of the front end 7 relative to the Y-axis. In the exemplary embodiment according to FIG. 1b, two reference points $R_1$ are provided, which are fixed mirror-symmetrically on the right and left side members 9 relative to the actual vehicle center $y_o$ and are identically formed. This measure further facilitates the fitting of the front end 7.

As best seen in FIG. 2, an insert 14 is provided for fixing the reference point $R_1$ relative to the Y-axis. The insert is preferably located on a supporting part of the body shell, such as side members and cross members. The insert 14 may be temporarily fixed to the vehicle body shell while the vehicle body part is being fitted, or it may be permanently fixed thereto.

Insert 14 is shown embodied as a bracket 13 that is firmly fitted to the side member 9 according to the determined distance $+Y_{0.5}$ and $-Y_{0.5}$ from the actual vehicle center $y_0$ that has been determined to be the vehicle zero point relative to the Y-axis. Any appropriate method may be used to secure the bracket 13 to the side member 9 may be used, such as welding.

The bracket 13 is shown to comprise a sheet-metal plate with a main surface 15, the edges of which are bent laterally in order to stabilize its shape. After fitting the front end 7 it remains as a potential deformation part on the side member 9. The bracket 13 has a seat 17 embodied as a seating slot 16 with depth dimension t. The narrow inner side walls 18 of the seating slot 16 are located on the side member 9 approximately perpendicularly to the Y-axis. The seating slot 16 opens in the direction of the Z-axis. In the exemplary embodiment according to FIG. 1a, the bracket 13 is fitted only on the right (relative to the vehicle body) side member 9, while in the exemplary embodiment according to FIG. 1b it is fitted on both side members 9.

For locating the front end 7 on the body shell 1, a locating element 19 is provided on the support frame 6 and a locating pin 20 engages approximately in the direction of the Z-axis in the seating slot 16 of the bracket 13, as indicated by dashed lines in FIG. 3. When introduced into the seating slot 16, the locating pin 20 rests on the seat base 21 and, positively interlocking relative to the Y-axis, bears against the inner side walls 18. The seat base 21 thus serves as a limit stop for the locating pin 20, the locating pin thereby being fixed on the side member 9 relative to the Y-axis. To facilitate the introduction of the locating pin 20 into the seating slot 16 the latter may be widened towards the top and the seat base 21 may be radiused. The locating element 19 may be an integrally-formed portion of the body component to be fitted (in the depicted example, the support frame 6) or it may be a separate component that is attached to the body component.

Since the locating pin 20 rests on the seat base 21, at this point the Z-axis is also fixed by the position of the seat base 21 relative to the side member 9. Since a bracket 13 having a specific position of the seat base 21 is used here, no account is taken of the relative, mutual position of the two side walls 3 relative to the Z-axis. Not shown in more detail here, but feasible according to the invention, is an insert having an adjustable point for fixing the Z-axis according to the relative position of the side walls 3 in relation to the Z-axis. For this purpose the seat base of the bracket may be of height-adjustable design, for example. Alternatively the bracket may comprise a plurality of seats having seat bases of different heights, of which one specific seat is used, based on the measurement of the relative position of the side parts.

As described above, gauging of the actual position of at least one partial area of the side wall relative to at least a first coordinate axis of the vehicle makes it possible to detect errors in shape and the position error of the side wall in relation to the underbody assembly and to compensate easily and optimally for this via the locating of at least one reference point. A reference is thereby created, which can be reliably determined by means of a simple, easy device without the aid of complicated optical systems. The disclosed method can therefore be reliably used even in technically less well-equipped automobile production facilities. Furthermore, the method allows the positioning of the side wall or side walls to be determined individually for each vehicle, so that account can always be taken of the actual position of the side wall of each individual vehicle, thereby achieving an optimum gap and fit pattern.

Gauging of the actual position of at least one partial area of the side wall relative to at least a first coordinate axis of the vehicle can be carried out without any contact. Gauging of the actual position is preferably done by means of a measuring device employing laser measurement.

The actual position of at least one partial area of the two side walls, such as their A-, B- and/or C-pillars, in the body shell is preferably registered relative to at least a first coordinate axis of the vehicle. From this it is possible to determine the actual zero point, for example relative to the Y-axis, as the vehicle center. The reference point can then be set by means of a simple centering device and then fixed, so that it relates to the actual vehicle center relative to the first coordinate axis.

The determination of the zero point can also serve as a basis for determining and locating further reference points relative to the respective coordinate axis, to which the zero point relates. This can be particularly advantageous in the case of vehicle body components which are to be arranged mirror-symmetrically and/or in that of vehicle body components which are to be arranged between two vehicle body components that are to be arranged mirror-symmetrically. The method according to the invention is likewise suited to determining at least one reference point relative to at least one coordinate axis of the vehicle, no matter which. The reference point for the vehicle body component to be fitted may be determined relative to a second and/or a third coordinate axis of the vehicle, the first, second and third coordinate axes preferably aligned mutually perpendicular to one another.

For fixing at least one reference point relative to at least one further coordinate axis a further, already plotted reference point relative to the further coordinate axis may be used for another vehicle body component to be fitted before it is fixed to the body shell. Owing to their relatively short distance from the reference point to be plotted, reference points of adjacent vehicle body components are particularly suitable for this purpose.

The object can be achieved in full in that the actual position of a pre-assembled vehicle body part is gauged relative to at least the first coordinate axis of the vehicle and in that on the basis of the gauge measurement at least one reference point for the vehicle body component to be fitted is plotted relative to at least the first coordinate axis of the vehicle. Similarly it is possible to determine the actual position of two pre-assembled vehicle body components relative to at least the first coordinate axis, and from this a specific reference point, such as the zero point, relative to which the reference point for the vehicle body component to be fitted can be located. In both cases possible assembly errors of the previously assembled vehicle body component or components can also be compensated for. In both cases, for the vehicle body component to be fitted at least one reference point relative to at least the first coordinate axis of the vehicle can be plotted on the basis of the gauge measurement and the vehicle body component to be fitted can be mounted relative to this minimum of one reference point as further steps in the method previously outlined.

To facilitate seating of the locating element to be fitted the seat may comprise a depression or recess having a depth dimension. The bracket may be fixed to the vehicle body so that the depth dimension runs at least approximately perpendicularly to the first coordinate axis in the direction of a second coordinate axis of the vehicle. The second coordinate axis of the vehicle preferably runs perpendicularly to the first coordinate axis and a third coordinate axis of the vehicle. The reference point can therefore be adjusted relative to the second coordinate axis via the magnitude of the depth dimension. The seat may be formed with an adjustable depth dimension. Alternatively the bracket may comprise a plurality of seats of different depth dimensions, a seat being selected on the basis of the gauge measurement relative to the second coordinate axis. Different brackets, each having a different depth dimension, may also be provided in the course of production. The provision, locating and/or fixing of the suitable bracket may be done automatically on the basis of the gauge measurement.

The seat may comprise a seat base. The seat cross section may taper in the direction of the depth dimension or towards the seat base. This affords a funnel or wedge-shaped guide for easier introduction of the locating element.

The bracket is preferably embodied as a sheet-metal plate. It preferably comprises a seat on the end face. The seat may comprise a seating slot, which opens laterally and preferably perpendicularly into the larger side faces of the sheet-metal plate. For more precise locating of the vehicle body component to be fitted the bracket may be located on the vehicle body so that the seating slot extends laterally in the direction of the third coordinate axis.

In the fitting position of the component the locating element is preferably located so that it engages positively and/or non-positively in the seat at least relative to the coordinate axis or axes. A socket and/or snap connection, for example, may be provided for this purpose.

The locating element is preferably arranged so that it interlocks positively in the seating slot. Should the seat cross section taper in the direction of the depth dimension towards the seat base, the seat cross section in the area of the seat base may be formed so that the associated locating element bears laterally and positively on the side walls of the seat and/or so that it rests on the seat base. A firm fit of the locating element in the seat can thereby be achieved relative to the first coordinate axis. The seat base may serve as reference point.

The insert or bracket may be fixed to the body shell by means of a conventional joining method, such as welding, adhesive bonding or soldering. The insert or bracket may be secured on the vehicle body by laser welding or arc welding, for example by the Weldfast method. The plate-like bracket may have an angled foot for bracing and fixing to the body shell. The plate-like bracket is preferably embodied as a butt plate with extended foot, which can be connected directly to the body shell with a cohesive material joint by, for example, the Weldfast method.

According to a conventional assignment in automobile construction, the three coordinate axes are defined as the X axis aligned with the vehicle longitudinal axis or length, the Y axis aligned with the vehicle lateral axis or width, and the Z axis aligned with the vehicle vertical axis or height. Which of these coordinate axes is regarded as first axis, second coordinate axis or third coordinate axis ultimately depends on the position of the vehicle body component to be fitted and hence on the coordinate to be determined. The relative position of the side walls relative to two or all three of the coordinate axes can also be gauged, in order thereby to determine the actual vehicle center in respect of the side walls relative to the two or all three coordinate axes and, relative to this, to attach to the body shell the requisite reference points for the vehicle body to be fitted or the vehicle body parts to be fitted.

The vehicle body component may be a single component or it may be built up from two or more prefabricated components. The vehicle body component may be a prefabricated module. The method according to the invention is particularly suitable for fitting a vehicle body component which is fixed to the underbody assembly and to at least one side wall, since here the errors initially considered assume particular significance. The vehicle body component to be fitted may be the front end of the vehicle, in which case this may take the form of a module comprising at least some of the components previously described. Here the actual position of at least one partial area of the two side walls and preferably the A-pillars in the body shell may be gauged. The gauging is preferably done relative to the width of the vehicle, that is to say the Y coordinate axis. From this it is possible to determine an actual $Y_0$ point as vehicle center, relative to which the reference point can be set preferably on the underbody assembly.

Gauging may still also be performed relative to at least one of the other coordinate axes. The coordinates of at least one already plotted reference point for fenders and/or engine hood are preferably used for fixing at least one reference point relative to the X coordinate axis and/or Z coordinate axis.

For locating of the front end via the insert, it is therefore possible to create a reference point relative to the Y-axis, which is located on the underbody assembly according to the measured, actual position of the side walls. Moreover a Z-axis coordinate can be determined via the formation of the seat of the bracket. Alternatively the Z coordinate may also be fixed in a further reference point and preferably on both side walls. The X coordinate may be fixed by means of a limit stop of the front end against the underbody assembly, as described above. The front end can therefore be fully oriented according to the side walls by four limit stops relative to the X coordinate axis, two seats preferably for locating pins or needles as locating elements relative to the Z coordinate axis and a seat preferably for locating pins or needles as locating elements relative to the Y coordinate axis. An optimum gap and fit pattern can thereby be ensured.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed:

1. A method for fitting a vehicle body component to a body shell of a vehicle having a side wall, the method comprising:
    gauging an actual position of a partial area of the side wall relative to a first coordinate axis of the vehicle;
    plotting a first reference point relative to the first coordinate axis on the basis of the gauged actual position, the first reference point plotted relative to an actual zero point located at a vehicle center relative to the first coordinate axis;
    plotting a second reference point relative to the actual zero point, the second reference point located an equal distance from the zero point in an opposite direction along the first coordinate axis; and
    mounting the vehicle body component relative to the first reference point.

2. The method of claim 1, wherein the partial area is an A-pillar of the vehicle.

3. The method of claim 1, wherein the first reference point is defined by an insert attached to the body shell at a location based upon the gauge measurement.

4. The method of claim 3, wherein the insert comprises a bracket for receiving a locating element associated with the body component, the bracket defining a limit stop for positioning the locating element.

5. The method of claim 4, wherein the limit stop comprises a recess having a depth dimension, the bracket is fixed relative to the body shell so that the depth dimension runs in the direction of a second coordinate axis of the vehicle, and the second coordinate axis is perpendicular to the first coordinate axis.

6. The method of claim 5, wherein the bracket comprises a plate and the depth dimension is established by a seating slot formed therein, the bracket being located on the body shell so that the seating slot extends along the second coordinate axis.

7. The method of claim 6, wherein the seating slot comprises a seat base, and a cross section of the seating slot tapers in the direction of the depth dimension towards the seat base, the seat cross section in the area of the seat base being formed so that the associated locating element bears laterally and positively in the seat.

8. The method of claim 3, wherein the insert is fixed on the body shell by welding.

9. The method of claim 1, wherein the vehicle body component to be fitted is a front end of the vehicle, wherein the first coordinate axis is parallel to a lateral axis of the vehicle, and wherein the actual position is gauged relative to the lateral axis of the vehicle and from this a lateral vehicle center is determined.

10. The method of claim 9, wherein the vehicle comprises an underbody assembly having at least one side member and wherein a position of the front end relative to a vehicle longitudinal axis is fixed by a limit stop defined on the at least one side member.

11. The method of claim 1, wherein the gauging is carried out by a non-contact measuring device.

12. A method for fitting a front end support frame to a body shell of a vehicle having a left and a right side wall, the method comprising:
    gauging an actual position of a partial area of at least one of the side walls relative to a lateral axis of the vehicle;
    registering the actual position of the partial area relative to the lateral axis;
    from the actual position, determining an actual zero point of the body shell relative to the lateral coordinate axis;
    plotting a first reference point relative to the lateral axis on the basis of the actual zero point;
    plotting a second reference point relative to the lateral axis on the basis of the actual zero point, the second reference point being located an equal distance from the zero point in an opposite direction along the first coordinate axis; and
    securing the front end support frame to the body shell at a designated position relative to at least one of the first and second reference points.

* * * * *